(12) United States Patent
Ellsworth et al.

(10) Patent No.: US 8,944,709 B2
(45) Date of Patent: Feb. 3, 2015

(54) FLUID APPLICATION DEVICE

(76) Inventors: Daniel Thomas Ellsworth, Ruckersville, VA (US); Adam Christian Ellsworth, Gaithersburg, MD (US)

( * ) Notice: Subject to any disclaimer, the term of this patent is extended or adjusted under 35 U.S.C. 154(b) by 488 days.

(21) Appl. No.: 13/251,247

(22) Filed: Dec. 15, 2011

(65) Prior Publication Data

US 2012/0093568 A1    Apr. 19, 2012

Related U.S. Application Data

(60) Provisional application No. 61/392,965, filed on Oct. 14, 2010.

(51) Int. Cl.
| | | |
|---|---|---|
| *A46B 11/00* | (2006.01) | |
| *A01M 21/04* | (2006.01) | |
| *B05C 1/06* | (2006.01) | |
| *B05C 17/00* | (2006.01) | |

(52) U.S. Cl.
CPC ............... *A01M 21/043* (2013.01); *B05C 1/06* (2013.01); *B05C 17/00* (2013.01)
USPC .............................. 401/10; 401/188 R; 401/9

(58) Field of Classification Search
USPC ............. 401/16, 17, 22–26, 136–140, 188 R, 401/196, 205–207, 261, 263–266, 10, 9
See application file for complete search history.

(56) References Cited

U.S. PATENT DOCUMENTS

| | | | | |
|---|---|---|---|---|
| 2,338,195 | A | * | 1/1944 | Mills et al. .................... 118/226 |
| 3,048,878 | A | * | 8/1962 | Gray et al. ....................... 401/10 |
| 4,347,010 | A | * | 8/1982 | Petkoff ........................... 401/10 |
| 4,716,677 | A | | 1/1988 | Moore |
| 4,947,580 | A | * | 8/1990 | Moore .............................. 47/1.5 |
| 5,222,268 | A | * | 6/1993 | Snodgrass ......................... 15/29 |
| 5,329,727 | A | | 7/1994 | Dixon |
| 5,499,474 | A | | 3/1996 | Knooihuizen |
| 5,724,765 | A | | 3/1998 | Wegner |
| 6,558,060 | B1 | * | 5/2003 | Raju ............................... 401/10 |

* cited by examiner

*Primary Examiner* — David Walczak

(57) ABSTRACT

A fluid application device includes a clamp portion including two clamp arms, at least one of the clamp arms including a sponge, a reservoir to store a fluid, and a trigger to move the clamp arms towards each other when pressed a first distance and to pump fluid from the reservoir to the sponge when pressed a second distance greater than the first distance.

17 Claims, 14 Drawing Sheets

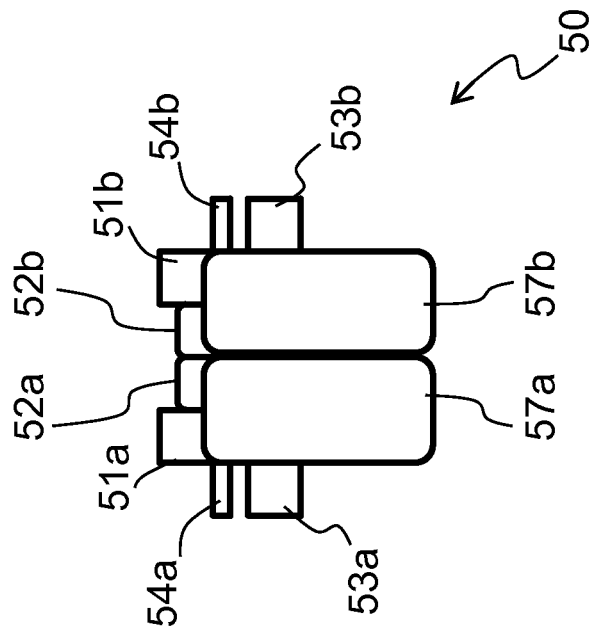
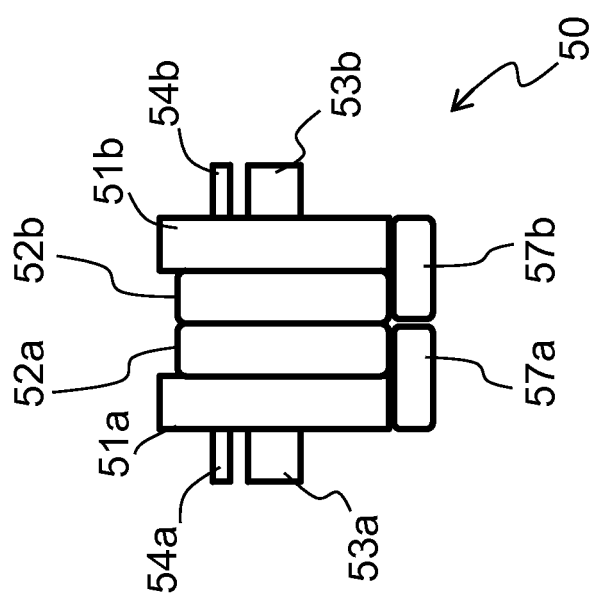

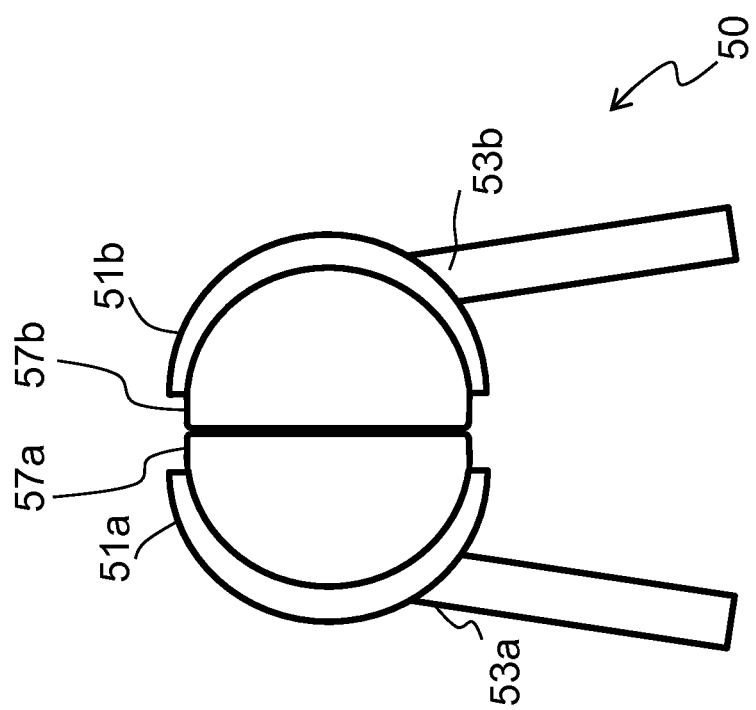

FLUID APPLICATION DEVICE

RELATED APPLICATIONS

The present application claims the benefit of Provisional Application No. 61/392,965, filed Oct. 14, 2010.

BACKGROUND

Plant and weed killing apparatuses are widely used in gardens, lawns, and plant beds both professionally and in by private gardeners. A common method of killing plants and weeds includes spraying herbicide onto the plant or weeds. However, this method can result in wasted herbicide, killing adjacent plants, and harming other plants and ecosystems when the herbicide runs off into the water supply.

Other plant and weed killing apparatuses allow a gardener to apply herbicide directly to a plant or weed using a porous surface, such as a sponge. However, in a crowded garden, herbicide may still contact adjacent plants.

BRIEF SUMMARY

Disclosed are a system and apparatus to apply a fluid to an object without applying the fluid to adjacent objects. In particular, disclosed is a fluid application device having a trigger that performs the functions of clamping a clamp and applying a fluid to sponges attached to the clamp.

Features of the present invention may be realized by a fluid application device including a clamp portion including two clamp arms, at least one of the clamp arms including a sponge, a reservoir to store a fluid, and a trigger to move the clamp arms towards each other and to pump fluid from the reservoir, both while pressing the trigger in the same direction. The clamp arms may move toward each other when the trigger is pressed a first distance and the fluid may be pumped from the reservoir to the sponge when pressed a second distance greater than the first distance.

The fluid application device may include a cable connected between the trigger and the clamp arms to move the clamp arms towards each other when the trigger is pressed.

The cable may include an elastic portion, such that the clamp arms move toward each other when the trigger is pressed the first distance, and the elastic portion prevents the clamp arms from moving toward each other when the trigger is pressed the second distance.

Each of the clamp arms may include a sponge, and the sponges may contact each other when the trigger is pressed the first distance.

The fluid application device may further include first and second tubes to supply fluid to the respective sponges of the clamp arms, and a third tube to supply fluid from the reservoir to the first and second tubes.

The fluid application device may further include a pump to pump fluid from the reservoir to the third tube, and wherein the trigger may activate the pump when pressed the second distance.

The trigger may not activate the pump when pressed the first distance.

Each sponge may be mounted to a base plate, and each base plate may be mounted to a respective clamp arm.

Each sponge may include a first portion to cover an inside surface of a respective base plate facing an opposing base plate, and a second portion to cover a side surface of the base plate.

The side surface of the base plate may include a bottom surface of the base plate.

The side surface of the base plate may further include at least a portion of a front surface of the base plate.

Each sponge may be mounted to an inside surface of a respective base plate facing an opposing base plate, and each sponge may extend past a bottom edge of the respective base plate.

Each sponge may not cover a side surface of the respective base plate other than the inside surface of the respective base plate.

Each base plate may include a nozzle to supply the fluid to the sponges, and each sponge may include an opening surrounding the nozzle.

Features of the present invention may also be realized by a fluid application device, including a clamp portion including two clamp arms, each clamp arm having a base plate mounted thereon, at least one of the base plates having a sponge mounted thereon to face the other base plate, a fluid storing reservoir, and a trigger to move the clamp arms towards each other without providing fluid to the sponge when moved from a rest position toward a first position, and to provide fluid to the sponge when moved to a second position past the first position with respect to the rest position.

The trigger may not move the clamp arms towards each other when moving from the first position to the second position.

Features of the present invention may also be realized by a method of supplying fluid in a fluid supplying device including two clamping arms, at least one of the clamping arms having a sponge mounted thereon, and a trigger to move the clamp arms and to supply a fluid to the sponge, the method including moving a trigger from a rest position to a first position, in response to moving the trigger from the rest position to the first position, moving the clamp arms toward each other, moving the trigger from the first position to a second position, the second position being farther from the rest position than the first position, and in response to moving the trigger from the first position to the second position, supplying fluid to the sponge.

The clamp arms may not be moved toward each other when the trigger is moved from the first position to the second position.

The fluid may not be supplied to the sponge when the trigger is moved from the rest position to the first position.

BRIEF DESCRIPTION OF DRAWINGS

FIGS. 6A to 6D illustrate front views of clamp portions.

FIGS. 7A to 7C illustrate bottom views of clamp portions.

DETAILED DESCRIPTION

Figure 1A:
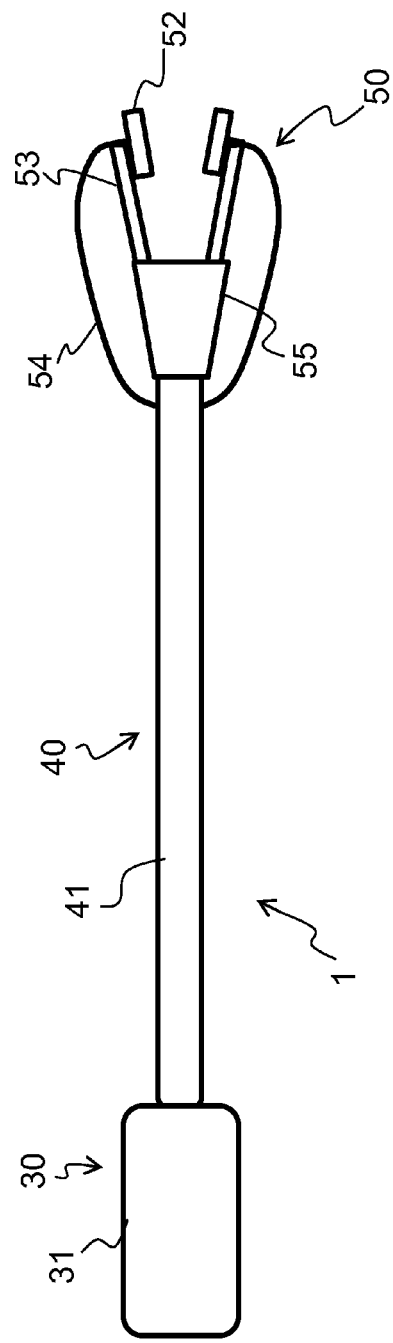
FIG. 1A is a top view of the plant-treatment device.
Figure 1B:
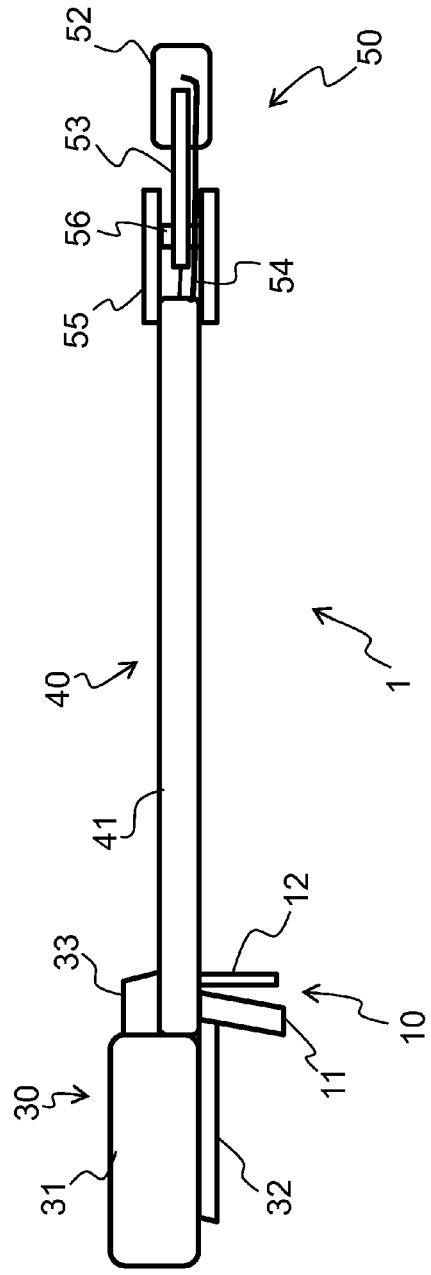
FIG. 1B is a side view of the plant-treatment device.

FIG. 1A illustrates a top view of a fluid application device 1, and FIG. 1B is a side view of the device 1. The device 1 includes a storage portion 30 including a reservoir 31 to store a liquid, an extended portion 40 including a shaft 41, and a clamp portion 50 at an end of the extended shaft 41. The clamp portion 50 includes sponges 52 to apply a fluid from the reservoir 31 to a plant or other surface. For example, the device 1 may be used to apply an herbicide or other liquid to a plant, or it may be used to apply a cleaning liquid, paint, or any other liquid to a surface clasped between the sponges 52.

The device 1 includes a grip portion 10 including a handle 11 and trigger 12. The reservoir 31 may rest on a support 32, and may connect to the main body of the device 1 via a connector 33.

Although the reservoir 31 is illustrated as being on an opposite side of the handle 11 from the extended portion 40, according to alternative embodiments, the reservoir may be located at any location, such as at a bottom portion of the handle 11.

The clamp portion 50 includes first and second arms 53 holding sponges 52. Tubes 54 connect the reservoir 31 to the sponges 52. The clamp portion 50 may also include a cover 55 and one or more hinge portions 56 to control the movement of the arms 53 towards and away from each other.

When a user presses the trigger 12, the arms 53 are moved together, and the sponges 52 may be pressed against each other. An object or plant to which a liquid is to be applied may be positioned between the sponges 52. When the trigger 12 is pressed further, the fluid may be pumped from the reservoir 31 to the sponges 52 to apply the fluid to the object or plant.

According to an alternative embodiment, both the clamping and the fluid pumping operations are performed simultaneously when the trigger 12 is pressed in one direction.

FIGS. 2A to 2D illustrate the structure and operation of the trigger portion 10 and the clamp portion 50. The top portion of each figure corresponds to the trigger portion 10, and the lower portion of each figure illustrates a corresponding state of the clamp portion 50.

The trigger portion 10 includes the trigger 12 and handle 11. The trigger 12 may rotate about a shaft 14. A wire, cord, cable, or other connection line 15 may connect the trigger 12 to the arms 53 of the clamp portion 50. The trigger 12 moves within a hole 13 in the body, represented by dashed lines in FIGS. 2A to 2D. A pump 16 is connected between the reservoir 31 and the trigger 12. An actuator 18 extends from the pump 18 towards the trigger 12, and tube 17 connects the reservoir 31 to the pump 16. A tube 19 extends from the pump 16 to the tubes 54a and 54b that connect to the sponges 52.

Figure 2A:
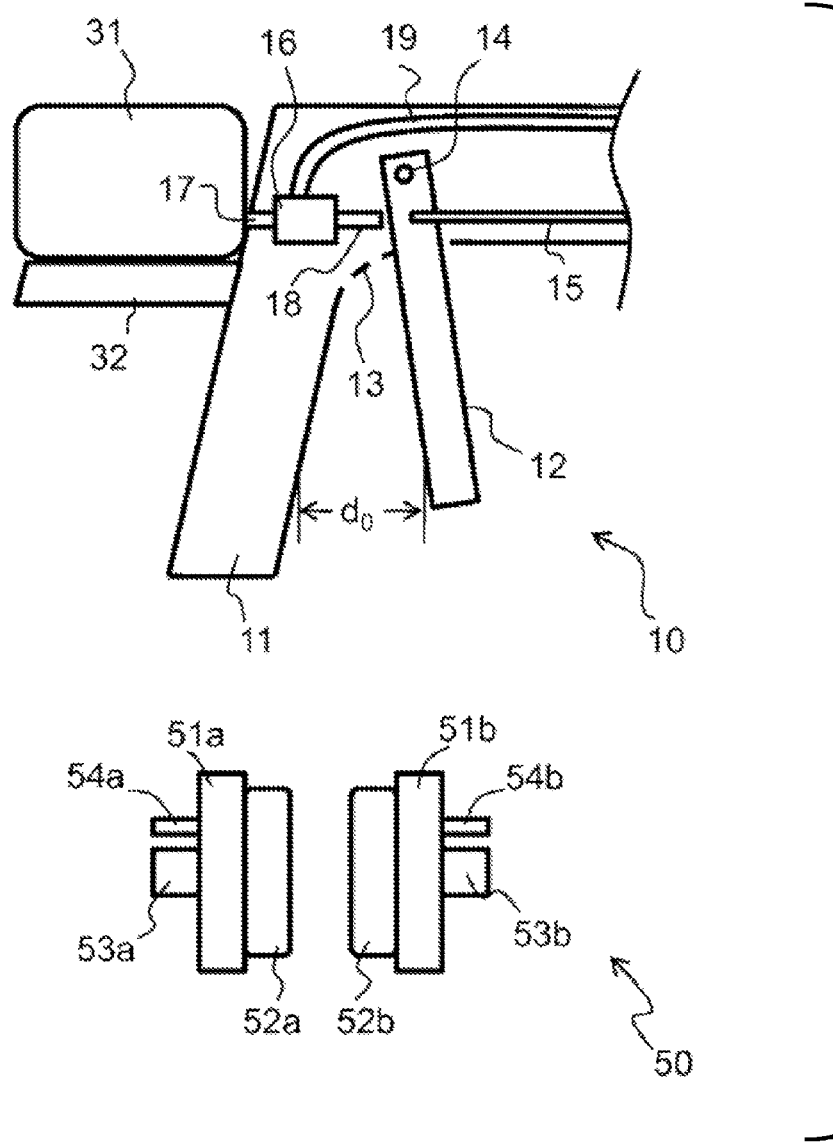
FIGS. 2A to 2D are cross-section views illustrating the two separate functions of the trigger mechanism and the positions of the clamp and sponges.

FIG. 2A illustrates the trigger 12 in a resting state. The trigger 12 is located at a first distance, $d_0$, from the handle 11.

The lower portion of FIG. 2A illustrates the position of the clamp portion 50 in the resting state. The clamp portion 50 includes two portions. Each portion may include a sponge 52 mounted onto a base plate 51. For example, FIG. 2A illustrates a first sponge 52a mounted to a first base plate 51a opposing a second sponge 52b mounted to a second base plate 51b. First and second tube connectors 54a and 54b supply fluid to the sponges 52a and 52b. First and second clamp arms 53a and 53b are connected to the first and second base plates 51a and 51b, and are designed to move toward and away from each other to cause the sponges 52a and 52b to contact each other and move away from each other.

In the resting position, the sponges 52a and 52b and the base plates 51a and 51b are spaced apart from each other. The trigger 12 does not exert force upon the cable 15, and consequently, the clamp arms 53a and 53b do not approach each other. Alternatively, the trigger 12 may constantly exert a force upon the cable 15, but the force exerted in the resting state may be insufficient to cause the clamp arms 53a and 53b to approach each other. In addition, the trigger 12 does not press against the actuator 18 to cause the pump 16 to pump fluid from the reservoir 31 to the sponges 52a and 52b.

Figure 2B:
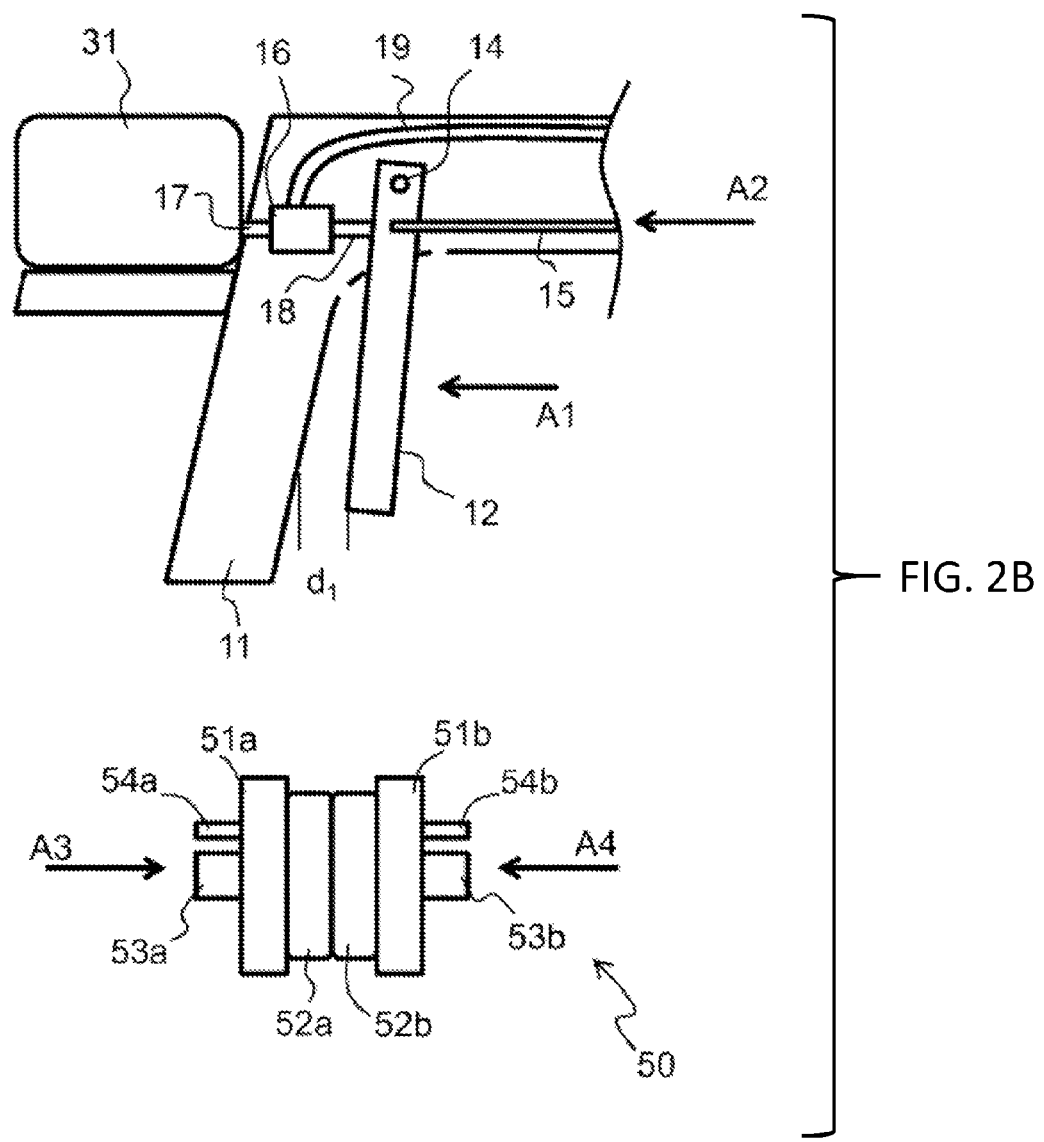

FIG. 2B illustrates the trigger mechanism in a second state. The trigger 12 is pressed towards the handle 11, as represented by the arrow A1. When the trigger 12 is pressed to be a distance $d_1$ from the handle 11, the trigger 12 pulls the cable 15, as indicated by the arrow A2. Consequently, as shown in the lower portion of FIG. 2B, the clamp arms 53a and 53b are moved toward each other as indicated by the arrows A3 and A4, and the sponges 52a and 52b are brought together to contact each other.

In the second state illustrated in FIG. 2B, the trigger 12 may contact the actuator 18. However, the trigger 12 does not press the actuator toward the pump 16, so that no fluid is pumped through the tube 19 to the sponges 52a and 52b. In other words, when the trigger 12 is squeezed a first distance, illustrated in FIG. 2B, the clamp arms 53a and 53b are moved towards each other, but the fluid is not pumped from the reservoir 31 to the clamp portion 50.

Figure 2C:
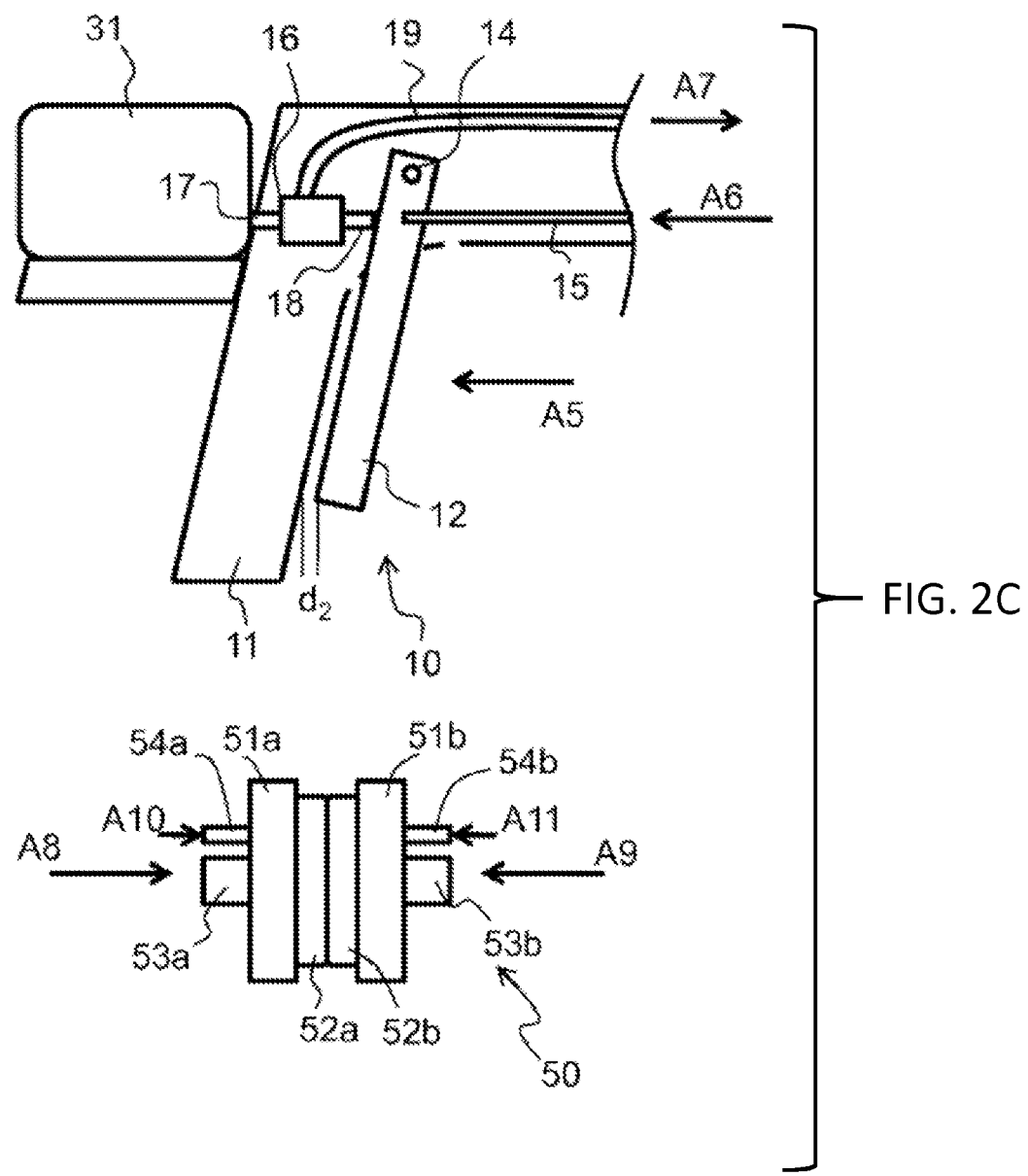
Figure 2D:
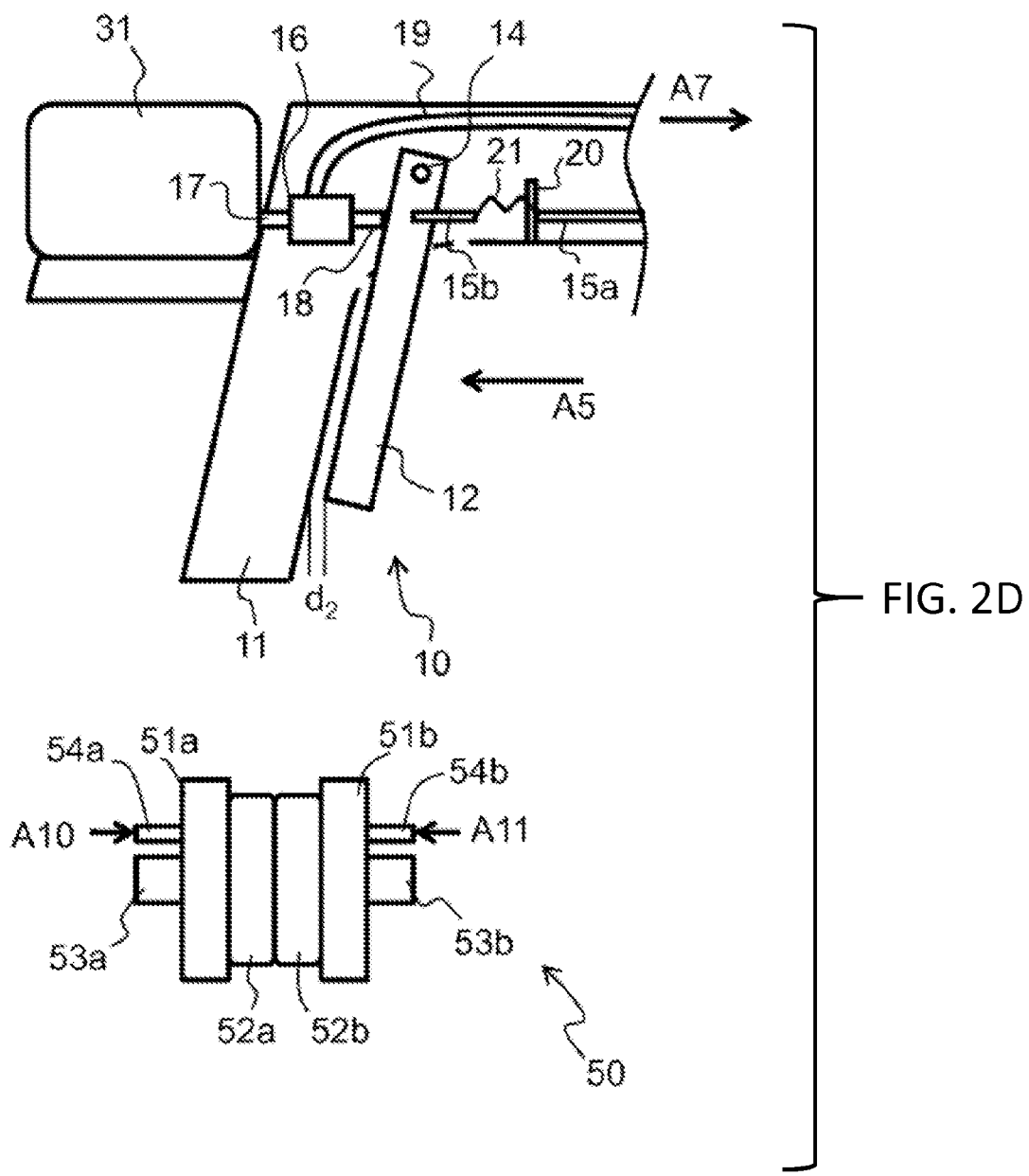

FIGS. 2C and 2D illustrate the trigger 12 pressed further toward the handle 11 to cause the pump 16 to pump fluid from the reservoir 31 to the sponges 52a and 52b. The trigger 12 is pressed toward the handle 11 as indicated by the arrow A5 until the trigger 12 is located a distance $d_2$ from the handle 11, where the distance $d_2$ is less than $d_1$ and $d_0$. The trigger 12 presses the actuator 18 toward the pump 16, activating the pump 16, and pumping fluid from the reservoir 31 through the tube 19 as indicated by the arrow A7 to the tubes 54a and 54b and the sponges 52a and 52b as indicated by the arrows A10 and A11.

In FIG. 2C, the trigger 12 pulls the cable 15 as indicated by the arrow A6, so that the clamp arms 53a and 53b move toward each other, as indicated by the arrows A8 and A9. The sponges 52a and 52b are pressed toward each other, which may compress the sponges 52a and 52b against each other.

FIG. 2D illustrates a cable 15 having first and second portions 15a and 15b separated by a spring or elastic portion 21 and a stopper 20. When the trigger 12 is pulled up to the first position illustrated in FIG. 2B, the cable 15 is also pulled with the trigger 12. However, when the trigger 12 is further pulled into the pumping position, as illustrated in FIG. 2D, the first portion of the cable 15a is stopped by the stopper 20 so that the sponges 52a and 52b are not compressed together, and the second portion of the cable 15b moves with the trigger 12. Consequently, when the cable 15 includes an elastic portion or spring portion, the fluid may be pumped to the clamp portions 50 without further pressing the sponges 52a and 52b against each other.

In addition, the spring or elastic member 21 may be positioned so that the sponges 52a and 52b compress against each other to a predetermined degree. In other words, although FIG. 2D illustrates a configuration in which the sponges 52a and 52b do not compress each other, the cable 15 may be configured to allow any predetermined degree of compression. Alternatively, the cable may be designed to have a predetermined degree of elasticity instead of having a separate elastic member or spring 21.

Although FIGS. 2A to 2D illustrate one configuration of a trigger 12, pump 16, and cable 15, any configuration may be used to achieve a similar result. For example, the cable may be a rigid rod, a rope, or a metal cable. Likewise, the pump 16 may be on an opposing side of the trigger 12, the pump 16 may be controlled by a pulling motion, a pressure-generating function, or by any other pumping function, and the trigger 12 may have any configuration including a rotation about the top as illustrated in FIGS. 2A to 2D, rotation about a bottom, or a linear sliding motion.

Figure 3B:
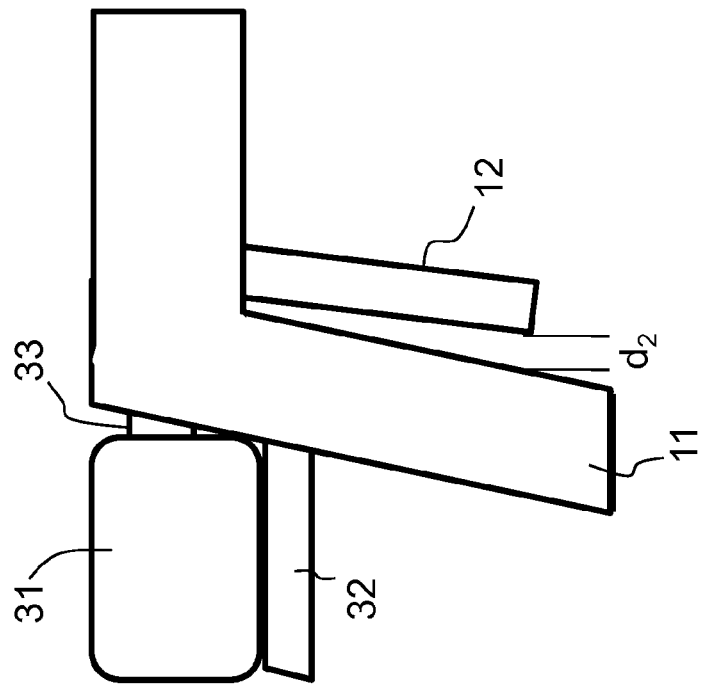
FIGS. 3A to 3F illustrate different trigger mechanisms.
Figure 3A:
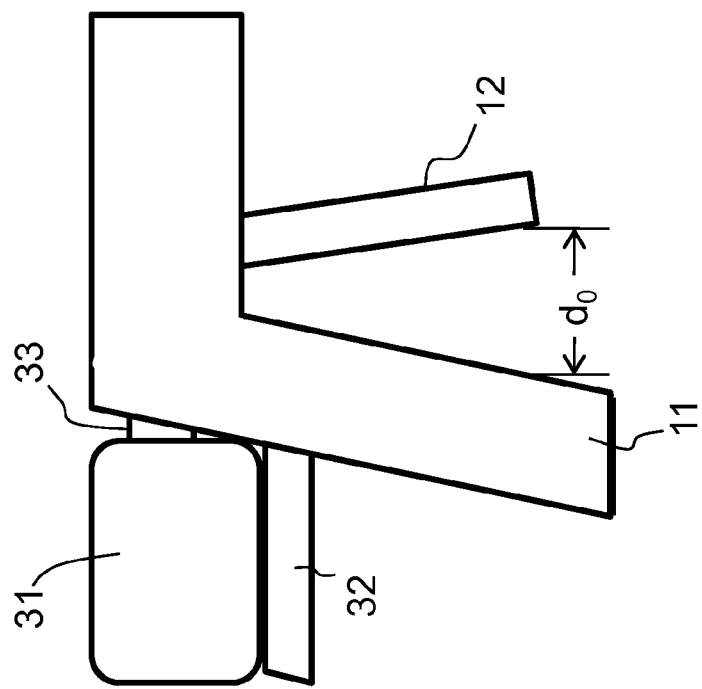
Figure 3D:
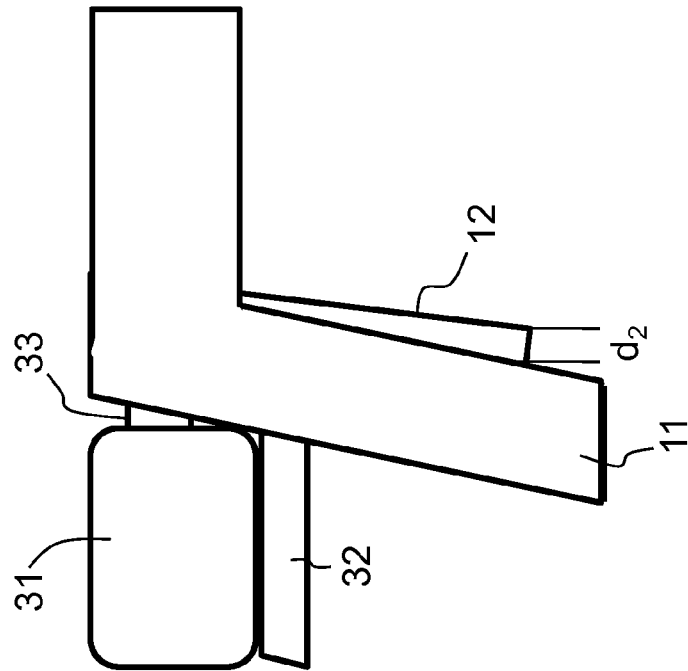
Figure 3C:
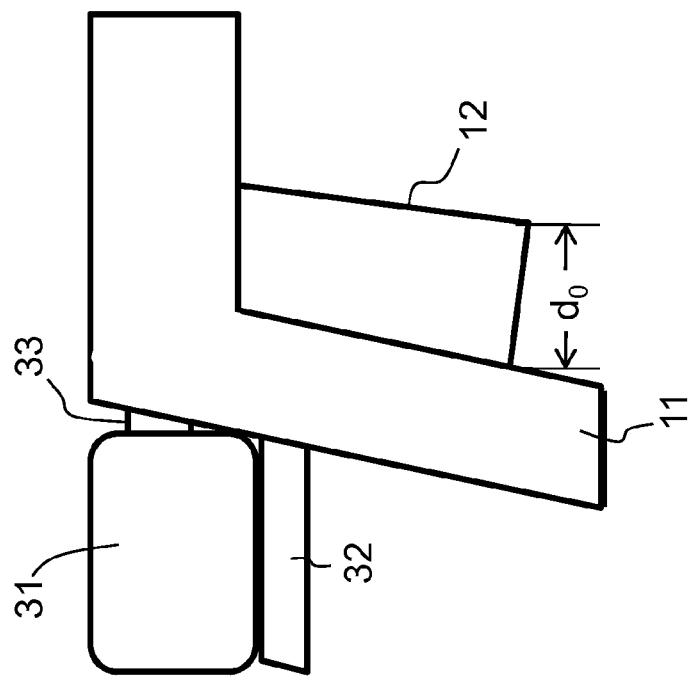
Figure 3F:
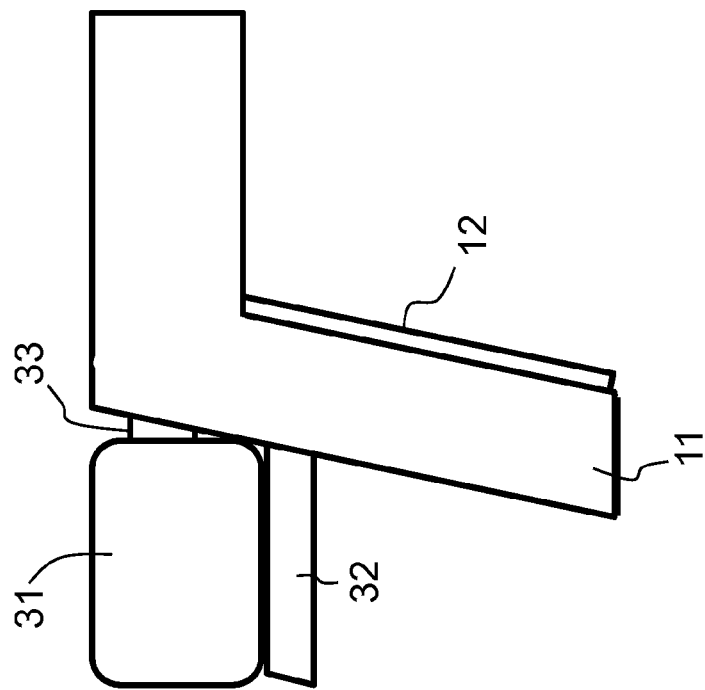
Figure 3E:
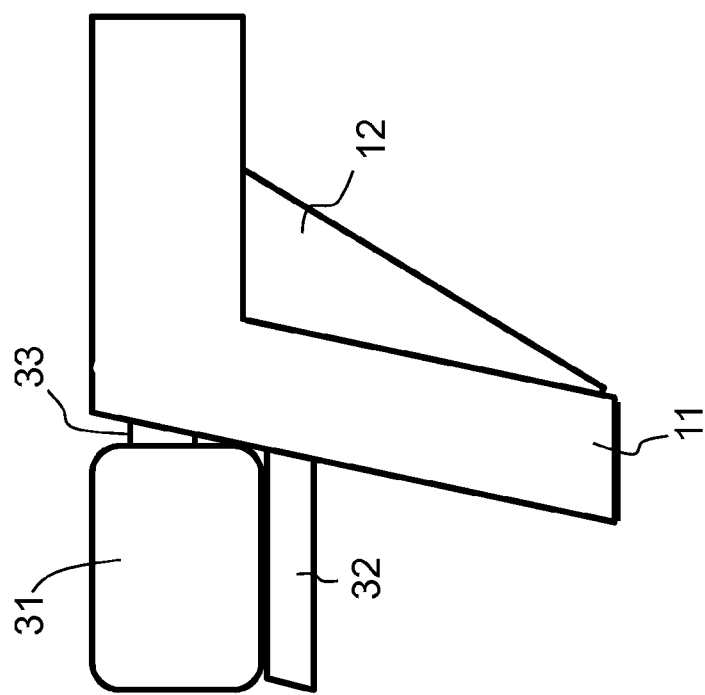

FIGS. 3A to 3F illustrate different types of trigger mechanisms. In FIGS. 3A and 3B, the trigger 12 rotates about a shaft in a top portion of the trigger 12. In FIGS. 3C and 3D, the trigger slides linearly toward the handle 11. In other words, the trigger 12 may not have a rotation motion when pressed toward the handle 11. FIGS. 3E and 3F illustrate a trigger that rotates about a shaft or hinge in a bottom portion of the trigger 12.

Figure 4B:
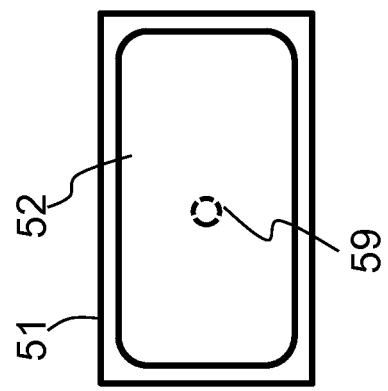
FIGS. 4A and 4B illustrate sponges and nozzles to supply the liquid to the sponges.
Figure 4A:
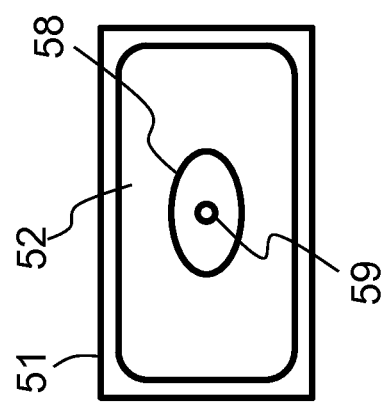

FIGS. 4A and 4B illustrate the sponge and base plate of the clamp portion 50. The sponge 52 is mounted to the base plate 51 which provides a stiff rear surface to allow the sponge 52 to compress against another sponge 52. Alternatively, only one of the clamp arms may include a sponge 52, and the other may be a rigid surface against which the sponge 52 may press.

The base plate 51 may include a nozzle 59 to provide liquid to the sponges 52. The sponge 52 may include an opening 58. The opening 58 may provide a path for the fluid to enter the sponge 52. The inner surface of the opening 58 may also provide a surface area into which the fluid may penetrate to saturate the entire sponge 52. Alternatively, as illustrated in FIG. 4B, the nozzle 59 may supply the fluid directly into the sponge 52, and there may be no opening in the sponge 52. The base plate 51 may also be provided with grooves or ridges to provide a capillary action for the fluid to disperse to the entire sponge 52.

FIGS. 1A to 4B illustrate a substantially rectangular sponge located on an inside surface of the base plate. However, the sponge may be of any desired shape, and may also be located on different surfaces of the base plate. In addition, the base plate may have different shapes.

Figure 5C:
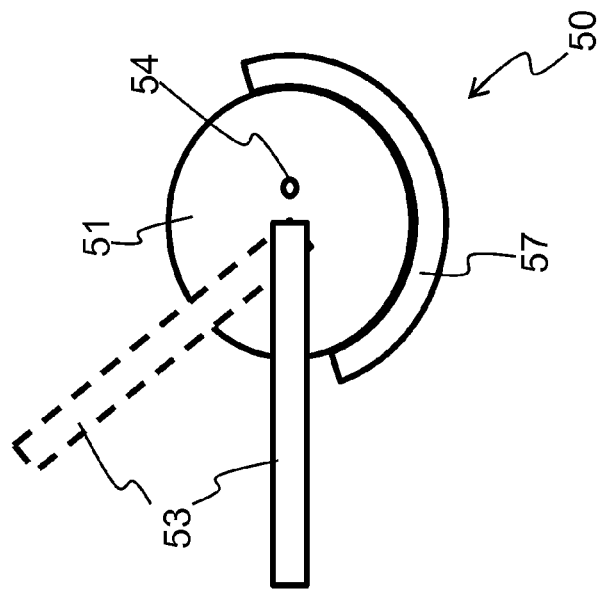
FIGS. 5A to 5C illustrate side views of clamp portions.
Figure 5B:
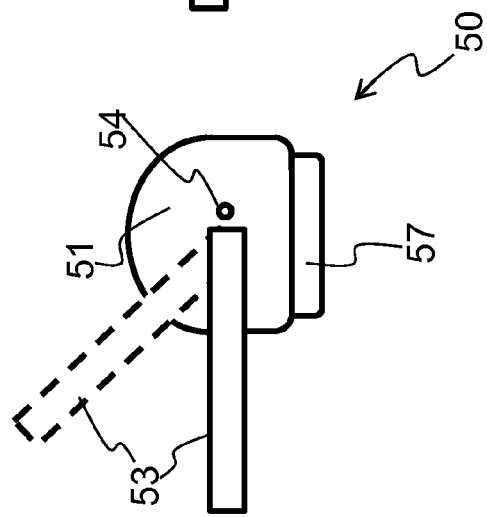
Figure 5A:
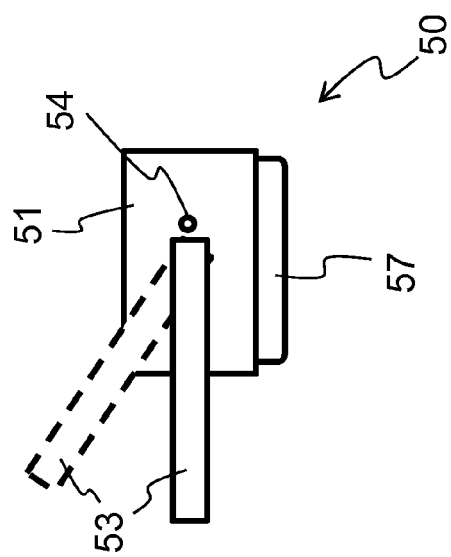

FIGS. 5A to 5C illustrate side views of the clamp portion 50, including the clamp arm 53 and the base plate 51. In FIGS. 5A and 5B, sponges 57 are included on a bottom side of the base plate 51, where the bottom side is the side that faces the ground. The clamp arm 53 may be arranged at any angle, as illustrated in the figures. For example, the clamp arm 53 may be arranged between 30 degrees to 60 degrees with respect to a horizontal plane defined by the ground and parallel to a bottom surface of the base plate 51. When the clamp arm 53 is configured to have an angle with respect to the ground, a user may hold the handle 11 and the bottom surface of the base plate may be aligned with the horizontal plane to allow the user to apply the sponge 57 to the ground. FIGS. 5A to 5C also illustrate the fluid receiving hole or tube 54 to receive fluid from the reservoir 31 and to provide the fluid to the sponges 52.

FIG. 5C illustrates a base plate 51 having a rounded shape, and the sponge 57 located on the outer surface of the base plate 51. Consequently, the clamp arm 53 may be held at any angle to correspond to users of different heights or ground levels of varying elevations, and the sponge 57 may still be parallel to or tangential to the ground to allow the user to apply the sponge 57 to the ground.

Figure 6C:
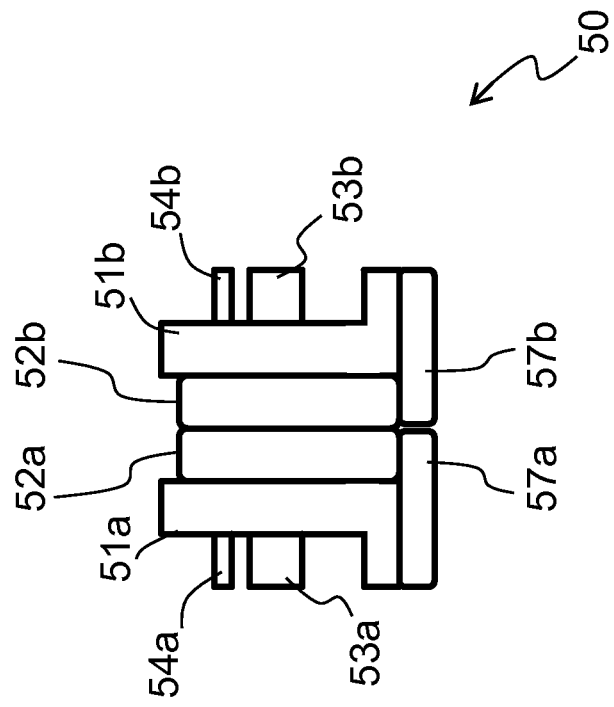

FIGS. 6A to 6D illustrate front views of the clamp portion 50. In FIG. 6A, which may correspond to the side views illustrated in FIGS. 5A and 5B, sponges 57a and 57b are positioned below each of the sponges 52a and 52b and the base plates 51a and 51b. The fluid tubes 54a and 54b may supply fluid to the sponges 52a and 52b, and the fluid may drain to the sponges 57a and 57b. Alternatively, the fluid tubes 54a and 54b may include a second set of tubes that supply fluid directly to the sponges 57a and 57b.

In FIG. 6A, the sponges 52 and 57 are illustrated as separate sponges. However, the sponges 52 and 57 may be a single sponge that is bent to cover the inside surface and bottom surface of the respective base plate 51.

FIG. 6B illustrates a clamp portion 50 in which the sponges 57a and 57b are located along the front sides of the base plates 51a and 51bFor example, the device of FIG. 6B may correspond to the device of FIG. 5C, in which the sponges 57a and 57b surround the bottom and front sides of the base plate 51.

FIG. 6C illustrates an embodiment in which the inside sponges 52a and 52b extend past a bottom ends of the base plates 51a and 51b by a distance $d_3$ to allow the sponges 52a and 52b to contact a surface below the bottom side or surface of the base plates 52a and 52b. No sponge may be located directly beneath the bottom surfaces of the base plates 51a and 51b. The clamp portion 50 of FIG. 6C may correspond to the clamp portions 50 of FIGS. 5A and 5B, for example.

Figure 6D:
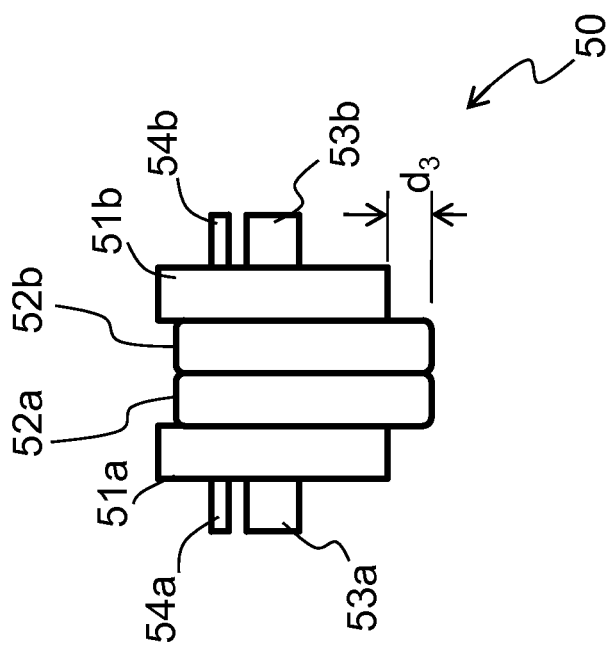

FIG. 6D illustrates a front view of a clamp portion 50 having base plates 51a and 51b which each have bottom surfaces extending from the main portion of the base plates 52a and 52b. The bottom surfaces may be of rectangular shapes, semi-circular shapes, or any other desired shape, as viewed from the bottom, and they provide a larger surface area for contacting a surface beneath the clamp portion 50. For example, if a user wants to apply a fluid in the sponges 57a and 57b to a plant on the ground, the sponges 57a and 57b provide the user with a larger surface area for contacting the plant. In addition, the features of FIG. 6D may be combined with those of FIGS. 5C to provide a sponge 57 that extends around the outer sides of the base plate 51 while also extending outward from the base plate 51.

Figure 7B:
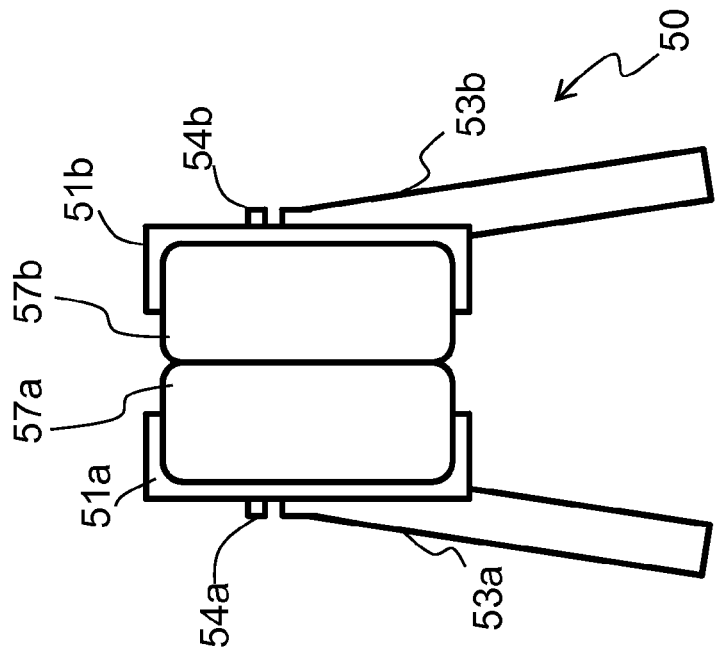
Figure 7A:
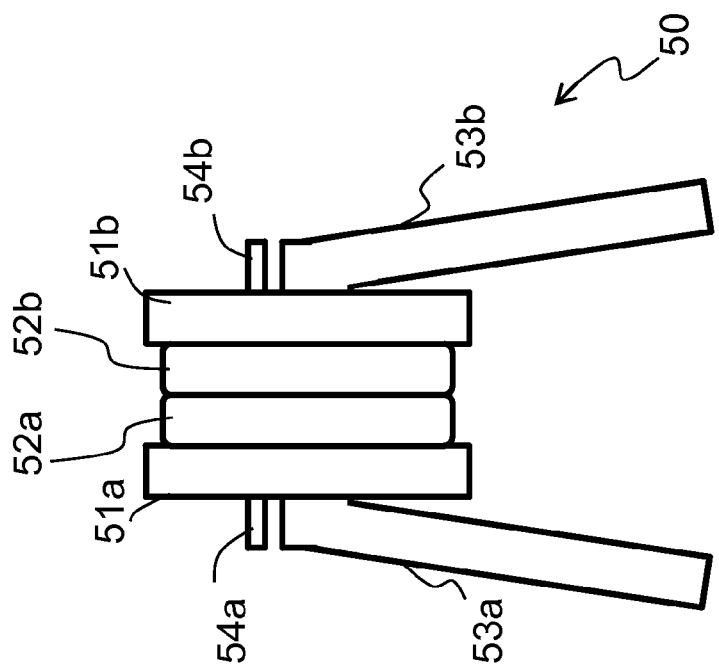

FIGS. 7A to 7C illustrate the clamp portion 50 from the bottom side view. FIG. 7A illustrates a clamp portion 50 in which sponges 52a and 52b are located on inside surfaces of the base plates 51a and 51b, respectively, but no sponge is located on the bottom surfaces of the base plates 51a and 51b. The clamp portion 50 of FIG. 7A may correspond to the clamp portion 50 of FIG. 6C, for example.

FIG. 7B illustrates a bottom side view of a clamp portion in which the sponges 57a and 57b extend across the bottom surface of the base plates 51a and 51b. In FIG. 7B, sponges 57a and 57b cover the bottom surface of the base plates 51a and 51b. Alternatively, each base plate 51a and 51b may include only a single sponge 52a and 52b, respectively, that is bent to cover both the inside surface of the base plate 51 and the bottom surface of the base plate 51.

FIG. 7C illustrates the clamp portion 50 in which the base plates 51a and 51b include extended portions at the bottom. The extended portions are covered in part by sponges 57a and 57b to provide a larger surface area to apply a fluid in the sponges 57a and 57b to a surface adjacent to the bottom surface of the base plates 51a and 51b. The clamp portion 50 of FIG. 7C may correspond to the clamp portion 50 of FIG. 6D, for example.

Although a few examples have been shown and described, it would be appreciated by those skilled in the art that changes may be made in these examples without departing from the principles and spirit of the general inventive concept.

What is claimed is:

1. A fluid application device, including:
   a clamp portion including two clamp arms, at least one of the clamp arms including a sponge;
   a reservoir to store a fluid;
   a trigger to move the clamp arms towards each other when pressed a first distance and to pump fluid from the reservoir to the sponge when pressed a second distance greater than the first distance; and
   a cable connected between the trigger and the clamp arms to move the clamp arms towards each other when the trigger is pressed.

2. The fluid application device of claim 1, wherein the cable includes an elastic portion, such that the clamp arms move toward each other when the trigger is pressed the first distance, and the elastic portion prevents the clamp arms from moving toward each other when the trigger is pressed the second distance.

3. The fluid application device of claim 1, wherein each of the clamp arms includes a sponge, and the sponges contact each other when the trigger is pressed the first distance.

4. The fluid application device of claim 3, further comprising first and second tubes to supply fluid to the respective sponges of the clamp arms, and a third tube to supply fluid from the reservoir to the first and second tubes.

5. The fluid application device of claim 4, further comprising a pump to pump fluid from the reservoir to the third tube, wherein the trigger activates the pump when pressed the second distance.

6. The fluid application device of claim 5, wherein the trigger does not activate the pump when pressed the first distance.

7. The fluid application device of claim 3, wherein each sponge is mounted to a base plate, and
each base plate is mounted to a respective clamp arm.

8. The fluid application device of claim 7, wherein each sponge includes a first portion to cover an inside surface of a respective base plate facing an opposing base plate, and a second portion to cover a side surface of the base plate.

9. The fluid application device of claim 8, wherein the side surface of the base plate includes a bottom surface of the base plate.

10. The fluid application device of claim 9, wherein the side surface of the base plate further includes at least a portion of a front surface of the base plate.

11. The fluid application device of claim 7, wherein each sponge is mounted to an inside surface of a respective base plate facing an opposing base plate, and
each sponge extends past a bottom edge of the respective base plate.

12. The fluid application device of claim 11, wherein each sponge does not cover a side surface of the respective base plate other than the inside surface of the respective base plate.

13. The fluid application device of claim 7, wherein each base plate includes a nozzle to supply the fluid to the sponges, and
each sponge includes an opening surrounding the nozzle.

14. A fluid application device, comprising:
a clamp portion including two clamp arms, each clamp arm having a base plate mounted thereon, at least one of the base plates having a sponge mounted thereon to face the other base plate;
a fluid storing reservoir; and
a trigger to move the clamp arms towards each other without providing fluid to the sponge when moved from a rest position toward a first position, and to provide fluid to the sponge when moved to a second position past the first position with respect to the rest position,
wherein the trigger does not move the clamp arms towards each other when moving from the first position to the second position.

15. A method of supplying fluid in a fluid supplying device including two clamping arms, at least one of the clamping arms having a sponge mounted thereon, and a trigger to move the clamp arms and to supply a fluid to the sponge, the method comprising:
moving a trigger from a rest position to a first position;
in response to moving the trigger from the rest position to the first position, moving the clamp arms toward each other;
moving the trigger from the first position to a second position, the second position being farther from the rest position than the first position; and
in response to moving the trigger from the first position to the second position, supplying fluid to the sponge,
wherein the clamp arms are not moved toward each other when the trigger is moved from the first position to the second position.

16. The method of claim 15, wherein fluid is not supplied to the sponge when the trigger is moved from the rest position to the first position.

17. A fluid application device, including:
a clamp portion including two clamp arms, each of the clamp arms includes a sponge;
a reservoir to store a fluid;
a trigger configured to move the clamp arms towards each other when pressed a first distance, the sponges configured to contract each other when the trigger is pressed the first distance, and the trigger configured to pump fluid from the reservoir to the sponge when pressed a second distance greater than the first distance; and
first and second tubes configured to supply fluid to the respective sponges of the clamp arms, and a third tube configured to supply fluid from the reservoir to the first and second tubes.

\* \* \* \* \*